(12) United States Patent
Bäumer et al.

(10) Patent No.: US 7,691,449 B2
(45) Date of Patent: Apr. 6, 2010

(54) COATING MATERIALS AND THE USE THEREOF FOR THE PRODUCTION OF WELDABLE COATINGS

(75) Inventors: Marc Bäumer, Münster (DE); Markus Ruckpaul, Heidelberg (DE); Petra Toboll, Havixbeck (DE); Silvia Lenter, Münster (DE)

(73) Assignee: BASF Coatings AG, Muenster (DE)

( * ) Notice: Subject to any disclaimer, the term of this patent is extended or adjusted under 35 U.S.C. 154(b) by 1488 days.

(21) Appl. No.: 10/517,238

(22) PCT Filed: Jul. 11, 2003

(86) PCT No.: PCT/EP03/07952

§ 371 (c)(1),
(2), (4) Date: Dec. 8, 2004

(87) PCT Pub. No.: WO2004/018576

PCT Pub. Date: Mar. 4, 2004

(65) Prior Publication Data

US 2005/0228113 A1 Oct. 13, 2005

(30) Foreign Application Priority Data

Aug. 8, 2002 (DE) .................. 102 36 349

(51) Int. Cl.
*B29B 15/00* (2006.01)
(52) U.S. Cl. .............. 427/421.1; 427/427.4; 427/427.5; 427/427.7; 428/418
(58) Field of Classification Search ............. 427/421.1, 427/427.4, 427.7, 427.5; 428/418
See application file for complete search history.

(56) References Cited

U.S. PATENT DOCUMENTS

| | | | | |
|---|---|---|---|---|
| 4,734,467 A * | 3/1988 | Yamada et al. | ......... | 525/440.02 |
| 4,826,899 A * | 5/1989 | Rees | ............. | 524/94 |
| 5,623,003 A * | 4/1997 | Tanaka | ......... | 523/428 |
| 5,739,204 A * | 4/1998 | Piana | ........... | 524/539 |
| 5,852,162 A * | 12/1998 | Smith et al. | ............ | 528/272 |
| 6,482,536 B1 * | 11/2002 | Tanaka et al. | ........... | 428/626 |
| 6,575,146 B1 | 6/2003 | Kanai et al. | | |
| 6,679,230 B2 | 1/2004 | Kanai et al. | | |
| 6,769,419 B2 | 8/2004 | Kanai et al. | | |
| 7,147,897 B2 * | 12/2006 | Pawlik et al. | ............ | 427/386 |
| 2003/0175541 A1 * | 9/2003 | Lorenz et al. | ........... | 428/546 |

FOREIGN PATENT DOCUMENTS

| | | |
|---|---|---|
| EP | 0 008 344 | 7/1979 |
| EP | 0 257 144 | 8/1986 |
| JP | 08-317507 | 11/1996 |
| JP | 10-299582 | 11/1998 |
| JP | 10-331727 | 12/1998 |
| JP | 2001-295689 | 10/2001 |

OTHER PUBLICATIONS

Material Safety Data Sheet, Iron Phosphide, pp. 1-3, 1995.*
English Abstract for EP00 083 44, publication date Feb. 5, 1980.

* cited by examiner

*Primary Examiner*—Binh X Tran
(74) *Attorney, Agent, or Firm*—Harness, Dickey & Pierce, P.L.C.

(57) ABSTRACT

Coating materials for the coil coating process, comprising
(A) as binder at least one aliphatic, araliphatic and/or aromatic polyester having an acid number of <10 mg KOH/g, a hydroxyl number of from 30 to 200 mg KOH/g, and a number-average molecular weight Mn of between 1000 and 5000 daltons,
(B) as crosslinking agent at least two amino-containing resins of different reactivity,
processes for preparing them, and their use as coil coating materials.

23 Claims, No Drawings

COATING MATERIALS AND THE USE THEREOF FOR THE PRODUCTION OF WELDABLE COATINGS

CROSS REFERENCE TO RELATED APPLICATIONS

This application is a National Phase Application of Patent Application PCT/EP2003/007952 filed on 11 Jul. 2003.

FIELD OF THE INVENTION

The present invention relates to novel coating materials, especially coil coating materials. The present invention also relates to the use of the novel coating materials for producing weldable coatings, particularly on coils.

PRIOR ART

Coil coating materials, which are applied predominantly by roller application using contrarotating rolls to steel coils, especially galvanized steel coils, or aluminum coils, are known. Since the processing of the metal does not take place until after the coating operation, the coatings need to have extremely high mechanical integrity. Typical drying times are from 20 to 40 seconds at a product or metal temperature or PMT (peak metal temperature) of from 200 to 260° C. The coated coils are used customarily in the architectural sector for producing ceiling and wall elements, doors, pipe insulations, roller shutters or window sections, in the vehicle sector for producing paneling for caravans or truck bodies, and in the household sector for producing section elements for washing machines, dishwashers, freezers, fridges or ranges (cf. Römpp Lexikon Lacke und Druckfarben, Georg Thieme Verlag, Stuttgart, N.Y., 1998, "coil coating", page 55, and "coil coating materials", page 116).

In order to simplify further the production of motor vehicles from a technical standpoint, and to make it more economic, it is desired to use preformed, coated section elements and moldings for producing vehicle bodies. For this to be possible, however, the coated coils and the section elements and moldings produced from them need to be able to be spot welded.

With the preformed coated section elements and moldings it is also intended that further improvements be made in corrosion protection for the bodies, so that corrosion protection measures, such as the flooding of cavities with wax, become superfluous. A further requirement is that the corrosion protection afforded by cathodically deposited and heat-cured electrocoats on coils be improved further, or that it be possible to do without the electrocoats entirely.

A substantial reduction in the PMT, moreover, would make the coil coating process even more economic and environment-friendly, since it would be possible to achieve significant reductions in the energy consumption and energy costs. This would make the coated coils even more attractive as alternatives to conventional coating processes. Additionally, there would be less of a thermal load on the coatings and on the metal panels, which would be fundamentally advantageous.

German patent application DE 10202543.6, unpublished at the priority date of the present specification, describes coating materials which can be used for coil coating. As binders they may comprise, inter alia, a polyester, although the hydroxyl number and acid number of said polyester is not specified. The coating materials may further comprise amino resin crosslinking agents. Mixtures of benzoguanamine-formaldehyde resins and melamine-formaldehyde resins are not described, however. In any case it is preferred to use blocked polyisocyanates. The coating materials further include anticorrosion pigments, electrically conductive pigments, and modified amorphous silica. They may also include thermal-crosslinking catalysts. There is no teaching, however, indicating the use of at least two catalysts for the thermal crosslinking of N-methylol groups and N-methoxymethyl groups and hydroxyl groups; in accordance with the preferred use of polyisocyanates as crosslinking agents, only dibutyltin dilaurate is expressly mentioned as catalyst.

THE PROBLEM ADDRESSED BY THE INVENTION

It is an object of the present invention that the coating materials, especially coil coating materials, should be suitable as a replacement for cathodically applicable primers and/or surfacer coats in OEM production (i.e., coating by the manufacturer). Another aspect of the object is that the coating materials, especially coil coating materials, ought to allow lower baking temperatures, especially for bake-hardening steels.

A further object of the present invention was to provide novel coating materials, especially coil coating materials, which give novel coatings that feature extremely high mechanical integrity and particularly effective weldability, especially spot weldability. It is also intended that the novel coating materials, especially coil coating materials, can be provided where necessary with anticorrosion pigments, so that the novel coatings produced from them also display a particularly high corrosion protection effect, without the weldability being affected by this. The novel coating materials, especially the coil coating materials, are to give novel coatings which produce better weld spots with a smooth, still esthetically appealing periphery. It is also intended that the weld connections should be particularly strong. The novel coatings, furthermore, are to feature a comparatively broad welding range and a comparatively low volume resistance, and result in a particularly high life quantity in terms of the welding electrodes. Not least, the novel coating materials ought to allow the novel coated coils to be baked at lower PMTs, so that the novel coil coating process, with a lower energy consumption, can be carried out in a particularly economic and environment-friendly way with relatively low thermal loading of the coils.

Solution

The invention accordingly provides the novel coating materials for coil coating processes, comprising (A) as binder at least one aliphatic, araliphatic and/or aromatic polyester having an acid number of <10 mg KOH/g, a hydroxyl number of from 30 to 200 mg KOH/g and a number-average molecular weight Mn of between 1000 and 5000, preferably from 1500 to 4000, and with particular preference from 2000 to 35 000 daltons, (B) as crosslinking agents at least two amino-containing resins of different reactivity.

Said crosslinking agent (B) preferably comprises (B1) at least one benzoguanamine-formaldehyde resin which may have been etherified fully and/or partly with methanol, and/or (B2) at least one melamine-formaldehyde resin, which may have been etherified with methanol or consists thereof.

The coating materials of the invention further preferably comprise (C) at least one electrically conductive pigment
(D) at least one anticorrosion pigment,
(E) at least one amorphous silica modified with metal ions,
(F) at least two catalysts of the thermal crosslinking of N-methylol groups and/or N-methoxymethyl groups with the complementary hydroxyl groups.

The novel coating materials are referred to below as "coating materials of the invention".

Further subject-matter of the invention will emerge upon reading the description.

In the light of the prior art it was surprising and unforeseeable for the skilled worker that the problem on which the present invention was based could be solved by means of the coating material of the invention.

In particular it was surprising that the coating materials of the invention, especially the coil coating materials of the invention, produced coatings of the invention which had extremely high mechanical integrity and particularly good weldability, especially by spot welding. In addition, the coatings of the invention displayed outstanding corrosion protection, without any adverse effect on the weldability as a result. At the same time the coating materials of the invention, especially the coil coating materials of the invention, gave coatings of the invention which produced better weld spots with a smoother, still aesthetically appealing periphery. Additionally, the weld connections were particularly strong. Moreover, the coatings of the invention had a comparatively broad welding range and a comparatively low volume resistance and resulted in a particularly high welding electrode life quantity; in other words, the number of weld spots that could be applied with one electrode was very high. Furthermore, the coatings of the invention had outstanding mechanical properties, so that there were no difficulties in deforming the coated coils in question.

This particularly advantageous profile of performance properties was obtained at significantly lower PMTs on curing, so that the coating process was particularly energy-saving, economic, and environment-friendly.

DETAILED DESCRIPTION OF THE INVENTION

The first essential constituent of the coating materials of the invention is at least one, especially one, saturated, aliphatic and/or cycloaliphatic, especially aliphatic, polyester (A) which functions as binder. The polyester (A) has an acid number of <10, preferably <6, and in particular <4 mg KOH/g and a hydroxyl number of from 30 to 200, preferably from 40 to 150, more preferably from 50 to 120, and in particular from 60 to 100 mg KOH/g.

Polyesters (A) may have a number-average molar mass Mn of preferably from 500 to 10 000, more preferably from 750 to 7500, with particular preference from 1000 to 5000 and in particular from 1500 to 4000 daltons. The polyesters (A) preferably have a narrow molecular weight distribution. They preferably feature a molecular weight polydispersity U=Mw/Mn−1 of <10, with particular preference <8, and in particular <6. They preferably have a glass transition temperature of from −20 to +50° C., more preferably from −10 to +40° C., with particular preference from −10 to +30° C., and in particular from −10 to +25° C.

In minor amounts, i.e., in amounts <50 eq %, based on the total amount of thermally crosslinkable reactive functional groups present in (A), the polyesters (A) may contain customary reactive functional groups other than the hydroxyl groups, which other groups are able to undergo thermal crosslinking reactions with the corresponding, customary, complementary reactive functional groups.

The polyesters (A) are compounds known per se. Their preparation is described, for example, in the standard work Ullmanns Enzyklopädie der technischen Chemie, 3rd edition, volume 14, Urban & Schwarzenberg, Munich, Berlin, 1963, pages 80 to 8.9 and 99 to 105, and also in the following books: "Résines Alkydes-Polyesters" by J. Bourry, Dunod, Paris, 1952, "Alkyd Resins" by C. R. Martens, Reinhold Publishing Corporation, N.Y., 1961, and "Alkyd Resin Technology" by T. C. Patton, Interscience Publishers, 1962. On the market they are available, for example, under the brand name Uralac® from DSM Kunstharze.

The amount of the polyesters (A) in the coating materials of the invention may vary widely and is guided primarily by the intended use of the coating materials and by the functionality of the polyesters (A) and of the crosslinking agents (B) with regard to the crosslinking reaction. In the coating materials of the invention they are present preferably in an amount of from 5 to 40%, more preferably from 7.5 to 35%, with particular preference from 10 to 30%, and in particular from 15 to 25% by weight, based in each case on the solids of a coating material.

The second essential constituent of the coating materials of the invention are at least two, especially two, crosslinking agents (B).

Of these, at least one, especially one, crosslinking agent (B) is at least one, especially one, benzoguanamine-formaldehyde resin (B1) which is fully and/or partly etherified with methanol, especially partly etherified, and at least one other, in particular one other, crosslinking agent (B) is at least one, especially one, melamine-formaldehyde resin (B2) which is etherified with methanol, preferably a fully etherified resin.

The crosslinking agents (B) are compounds known per se and are described, for example, in Römpp Lexikon Lacke und Druckfarben, Georg Thieme Verlag, 1998, page 29, "amino resins", in the textbook "Lackadditive" [Additives for coatings] by Johan Bieleman, Wiley-VCH, Weinheim, N.Y., 1998, pages 242 ff., in the book "Paints, Coatings and Solvents", second, completely revised edition, edited by D. Stoye and W. Freitag, Wiley-VCH, Weinheim, N.Y., 1998, pages 80 ff. They are sold, for example, by BASF AG under the brand name Luwipal®.

The crosslinking agents are preferably used in a (B1):(B2) weight ratio of from 1:10 to 10:1, more preferably from 1:7 to 7:1, with particular preference from 1:5 to 5:1, and in particular from 1:3 to 3:1.

The amount of the crosslinking agents (B) in the coating materials of the invention may vary widely and is guided primarily by their functionality and reactivity and also by the functionality of the polyesters (A) with regard to the thermal crosslinking. In the coating materials of the invention they are present preferably in an amount of from 1 to 10%, more preferably from 1.5 to 9%, with particular preference from 2 to 8%, with particular preference from 2.5 to 7%, and in particular from 3 to 8% by weight, based in each case on the solids of a coating material of the invention.

The third optional constituent of the coating materials of the invention is at least one, especially one, electrically conductive pigment (C). Suitable electrically conductive pigments (C) include a wide variety of customary, organic and inorganic, electrically conductive pigments. Their average particle sizes may vary widely. They are preferably between 0.5 and 50 µm, in particular from 1 to 30 µm.

They are preferably selected from the group consisting of elemental silicon and metallic, water-insoluble phosphides, preferably from the group consisting of $CrP$, $MnP$, $Fe_3P$, $Fe_2P$, $Ni_2P$, $NiP_2$, and $NiP_3$. Use is made in particular of iron phosphides.

The iron phosphides are commercial products and are sold, for example, under the brand name Ferrophos®.

The amount of the electrically conductive pigments (C) in the coating materials of the invention may vary widely and is guided by the requirements of the case in hand, in particular by the electrical conductivity of the coatings of the invention that is needed for very good weldability. In the coating materials of the invention the electrically conductive pigments (C) are present preferably in an amount of from 10 to 80%, more preferably from 15 to 75%, with particular preference from 20 to 75%, and in particular from 30 to 75%, based in each case on the solids of a coating material of the invention.

The fourth optional constituent of the coating materials of the invention is at least one, especially one, anticorrosion pigment (D). It is possible to use the customary, organic and inorganic, especially inorganic, anticorrosion pigments (D). They are preferably selected from the group consisting of zinc phosphate, especially zinc orthophosphate, zinc metaborate, and barium metaborate monohydrate, especially zinc orthophosphate and barium metaborate monohydrate.

Zinc phosphate and zinc orthophosphate are commercial compounds and are sold, for example, under the brand name Sicor® ZNP/S or the trade name zinc orthophosphate ZP-BS-M. Barium metaborate monohydrate is likewise a commercial compound and is sold, for example, under the brand name Butrol® 11M2.

The amount of the anticorrosion pigments (D) in the coating materials of the invention may vary widely and is guided primarily by the corrosion-promoting properties of the environment to which the coatings of the invention are subjected. In the coating materials of the invention the pigments (D) are present preferably in an amount of from 1 to 10%, more preferably from 1 to 9%, with particular preference from 1.5 to 8%, with particular preference from 1.5 to 7%, and in particular from 1.5 to 8% by weight, based in each case on the solids of a coating material of the invention.

The fifth optional constituent of the coating materials of the invention is at least one, especially one, amorphous silica (E) modified with metal ions. The metal ions are preferably selected from the group consisting of alkaline earth metal ions, especially calcium ions, scandium ions, yttrium ions, and lanthanum ions, lanthanide ions, and zinc ions and aluminum ions. Preference is given to employing calcium ions.

Amorphous silica (E) modified with calcium ions is also a commercial product and is sold, for example, under the brand name Shieldex® by Grace Davison.

The modified silica (E) is used preferably in an amount of from 1 to 10%, more preferably from 1 to 9%, with particular preference from 1.5 to 8%, with particular preference from 1.5 to 7%, and in particular from 1.5 to 8% by weight, based in each case on the solids of a coating material of the invention.

The sixth optional constituent of the coating materials of the invention are at least two, especially two, catalysts (F) of the thermal crosslinking of N-methylol groups and/or N-methoxymethyl groups with the complementary hydroxyl groups.

Of the catalysts (F), at least one, especially one, catalyst (F) is an acidic epoxy resin-phosphoric acid adduct (F1) and at least one other, especially one other, catalyst (F) is a blocked sulfonic acid (F2).

It is preferred to use the phosphoric acid adducts of low molecular mass epoxy resins as catalysts (F1). They are commercial products and are sold, for example, by Shell Resins under the brand name Epikote®.

Sulfonic acids blocked with organic amines, especially organic sulfonic acids, are preferably used as catalysts (F2). They are commercial products and are sold, for example, by King Industries under the brand name Nacure®.

The weight ratio of the catalysts (F1) and (F2) may vary widely; preferably, the (F1):(F2) ratio is from 20:1 to 1:3, more preferably from 15:1 to 1:1, with particular preference from 12:1 to 1.5:1, and in particular from 10:1 to 2:1.

The amount of the catalysts (F) in the coating materials of the invention is preferably from 0.5 to 10%, more preferably from 0.5 to 8%, with particular preference from 1 to 7%, and in particular from 1.5 to 6% by weight, based in each case on the solids of a coating material of the invention.

The coating materials of the invention may comprise at least one organic solvent (D). Examples of customary solvents are described in D. Stoye and W. Freitag (editors), "Paints, Coatings and Solvents", 2nd, completely revised edition, Wiley-VCH, Weinheim, N.Y., 1998, "14.9. Solvent Groups", pages 327 to 373. The amount of the organic solvent or solvents (G) may vary very widely and is guided primarily by the solubility and/or dispersibility of the soluble or dispersible constituents of the coating materials and by the viscosity which must be set for the application of the coating materials. In the coating materials of the invention the solvents (G) are present preferably in an amount of from 2 to 50% by weight, in particular from 5 to 40% by weight, based in each case on the total amount of a coating material of the invention.

The coating materials of the invention may further comprise at least one, especially one, surface-modified pyrogenic silica (I). The pyrogenic silica is preferably modified with a silylamine, especially bis(trimethylsilyl)amine. Surface-modified pyrogenic silicas are commercial products and are sold, for example, under the brand name Aerosil® by Degussa. In the coating materials of the invention they are present preferably in an amount of from 0.01 to 3% by weight and in particular from 0.1 to 2% by weight, based in each case on the solids of a coating material of the invention.

The coating materials of the invention may further comprise at least one, especially, one, compound (H) based on a polyphenol containing at least one, in particular at least two, epichlorohydrin group(s). By polyphenols are meant low molecular mass, oligomeric and polymeric compounds which contain at least two phenolic hydroxyl groups. Preferably at least two and in particular all of the phenolic hydroxyl groups of the polyphenols have been converted into epichlorohydrin ether groups. Preference is given to using bisphenol A and bisphenol F, especially bisphenol A, as polyphenol.

The compounds (H) are commercial products and are sold, for example, by Shell Resins under the brand name Epikote®. In the coating materials of the invention they are present preferably in an amount of from 0.5 to 10% by weight and in particular from 0.5 to 5% by weight, based on the solids of the respective coating material.

The coating materials of the invention may further comprise at least one compound (J) of the general formula I:

$$M_n(X)_m \qquad (I)$$

in which the variables and the indices have the following meanings:

M is at least one central atom selected from the group of Lewis acceptors,

X stands for Lewis donor ligands having at least one bridging atom selected from elements of main groups 5 and 6 of the Periodic Table of the Elements, n is from 1 to 500, and m is from 3 to 2000.

The compounds I can be monomeric (mononuclear) or dimeric, oligomeric or polymeric (polynuclear).

In the general formula I the variable M stands for at least one central atom selected from the group of Lewis acceptors. It is preferably selected from the group consisting of aluminum, titanium, and zirconium. M is preferably titanium.

In the general formula I the variable X stands for Lewis donor ligands having at least one bridging atom selected from the elements of main groups 5 and 6 of the Periodic Table of the Elements. The bridging atom is preferably selected from the group consisting of nitrogen, phosphorus, oxygen, and sulfur atoms, especially phosphorus atoms and oxygen atoms.

Lewis acceptors and Lewis donors are Lewis acids and bases in the sense of the Lewis acid-base theory.

In the general formula I the index n stands for a number, particularly an integer, from 1 to 500, preferably from 1 to 100, more preferably from 1 to 50, with particular preference from 1 to 20, and in particular from 1 to 20. The index m stands for a number, in particular an integer, from 3 to 2000, preferably from 3 to 1000, more preferably from 3 to 500, with particular preference from 3 to 100, and in particular from 3 to 50.

Examples of highly suitable compounds I are monomeric, dimeric, oligomeric or polymeric alkoxides of aluminum or titanium, such as

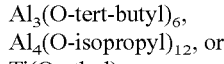,
$Al_4(O-isopropyl)_{12}$, or
$Ti(O-ethyl)_4$.

Examples of especially suitable compounds of the general formula I are compounds of the general formula II:

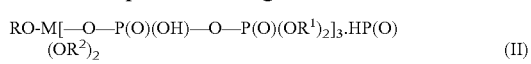 (II)

in which the variables R, $R^1$, and $R^2$ independently of one another stand for aliphatic and cycloaliphatic radicals and M is as defined above and is selected in particular from the group consisting of aluminum, titanium, and zirconium. With particular preference M is titanium.

In the general formula II the variables R, $R^1$, and $R^2$ stand independently of one another for aliphatic and cycloaliphatic, especially aliphatic, radicals. The aliphatic radicals preferably contain from 3 to 20 carbon atoms. Examples of suitable aliphatic radicals are propyl, isopropyl, butyl, sec-butyl, isobutyl, tert-butyl, n-pentyl, isoamyl, n-hexyl, n-heptyl, octyl, isooctyl, nonyl, decyl, undecyl, dodecyl, tridecyl, tetradecyl, pentadecyl, hexadecyl, heptadecyl, octadecyl, nonadecyl, and eicosanyl, preferably isopropyl, octyl, and isooctyl. With particular preference R is isopropyl, $R^1$ is octyl, and $R^2$ is isooctyl.

With very particular advantage, therefore, use is made of the adduct of isopropyl tris(dioctylpyrophosphato)-titanate with one mole of diisooctyl phosphite as constituent (J). The adduct is a commercial compound and is sold, for example, under the brand name KEN-REACT® by Kenrich Petrochemicals.

The coating materials of the invention preferably contain the compounds (J) in an amount of from 0.01 to 5%, more preferably from 0.05 to 8%, with particular preference from 0.1 to 7%, with very particular preference from 0.1 to 5%, and in particular from 0.1 to 3% by weight, based in each case on the solids of a coating material of the invention.

Furthermore, the coating materials of the invention may also comprise at least one additive (K), which is different than the above-described constituents (A) to (J) and is selected from the group consisting of organic and inorganic additives.

Examples of suitable additives (K) are customary color and/or effect pigments, fillers, nanoparticles, reactive diluents for thermal curing, crosslinking agents, UV absorbers, light stabilizers, free-radical scavengers, free-radical polymerization initiators, thermal-crosslinking catalysts, slip additives, polymerization inhibitors, defoamers, emulsifiers, devolatilizers, wetting agents, dispersants, adhesion promoters, leveling agents, film-forming auxiliaries, rheology control additives (thickeners), flame retardants, siccatives, dryers, antiskinning agents, corrosion inhibitors, waxes, and flatting agents, such as are known from the textbook "Lack-additive" by Johan Bieleman, Wiley-VCH, Weinheim, N.Y., 1998.

The preparation of the coating materials of the invention has no special features in terms of method but instead takes place by the mixing of the constituents described above. This can be done using mixing equipment, such as stirred tanks, dissolvers, inline dissolvers, bead mills, stirred mills, static mixers, toothed wheel dispersers or extruders. For the preparation, the individual constituents of the mixture of the invention may be incorporated separately, in succession. However, it is advantageous (1) to mix the constituents (A), (I), (E), (D), and (G) in the stated order and to grind the resulting mixture to a Hegmann particle size of <20 μm and (2) to add constituents (H), (B1), (B2), (C), (J), and (G) in the stated order to the ground mixture (1), and then (3) to homogenize the resulting mixture (2).

The catalysts (F1) and (F2) are preferably added to the homogenized mixture (3) shortly before application.

The coating materials of the invention are outstandingly suitable as materials for coil coating.

Coil coating starts from a metal strip—the "coil"—which has been conventionally cleaned, degreased, passivated, chemically treated, rinsed, and dried. The metal coil can be coated on one or both sides.

Suitable metals are all those from which it is possible to form coils which are equal to the mechanical, chemical, and thermal stresses of coil coating. Highly suitable metal coils are those based on aluminum or iron. In the case of iron, cold-rolled steels, electrolytically zinc-plated steels, hot-dip galvanized steels or stainless steels are especially suitable. The coils preferably have a thickness of from 200 μm to 2 mm.

For the coil coating, the metal coil passes through a coil coating line, such as is described, for example, in Römpp Lexikon Lacke und Druckfarben, Georg Thieme Verlag, Stuttgart, N.Y., 1998, page 55, "coil coating", or in German patent application DE 196 32 426 A1, at a speed adapted to the application and curing properties of the coating materials of the invention that are employed. The speed may therefore vary very widely from one coating operation to another. It is preferably from 10 to 150 m/min, more preferably from 12 to 120 m/min, with particular preference from 14 to 100 m/min, with very particular preference from 16 to 80 m/min and in particular from 20 to 70 m/min.

The coating materials of the invention may be applied in any desired way; for example, by spraying, flow coating or roller coating. Of these application techniques, roller coating is particularly advantageous and is therefore used with preference in accordance with the invention.

Each application step in roller coating may be conducted using two or more rolls. Preference is given to the use of from two to four, and especially two, rolls.

In roller coating, the rotating pickup roll dips into a reservoir of the coating material of the invention and so picks up the coating material to be applied. This material is transferred by the pickup roll, directly or via at least one transfer roll, to the rotating application roll. From this latter roll, the coating material is transferred onto the coil by means of codirectional or counterdirectional contact transfer.

Alternatively, the coating material of the invention may be pumped directly into a gap between two rolls, something which is also referred to by those in the art as nip feed.

In accordance with the invention, counterdirectional contact transfer, or the reverse roller coating process, is of advantage and is therefore employed with preference.

In roller coating, the peripheral speeds of the pickup roll and application roll may vary very greatly from one coating operation to another. The application roll preferably has a peripheral speed which is from 110 to 125% of the coil speed, and the pickup roll preferably has a peripheral speed which is from 20 to 40% of the coil speed.

The coating materials of the invention are preferably applied in a wet film thickness such that curing of the coating films results in coatings which are weldable, in particular by spot welding, and have a dry film thickness of from 4 to 12 μm, more preferably from 5 to 10 μm, with particular preference from 5 to 9.5 μm, and in particular from 6 to 9 μm.

The application methods described above may also be employed for the coating materials with which the coatings of the invention are overcoated, except where they are powder coating materials or electrocoats, in which case the customary special application methods are used, such as electrostatic powder spraying in the case of low-speed coils or the powder cloud chamber process in the case of high-speed coils, and cathodic electrodeposition coating.

In the case of heat curing, heating of the coating films of the invention takes place preferably by means of convective heat transfer, irradiation with near or far infrared, and/or, in the case of iron-based coils, by means of electrical induction. The maximum substrate temperature or PMT is preferably not more than 200° C., preferably 180° C., and in particular not more than 160° C. It is a very particular advantage of the coil-coating materials of the invention and of the coating processes of the invention that these comparatively low temperatures can be employed and yet result in coatings of the invention having outstanding performance properties.

The heating time, i.e., the duration of the heat cure, varies depending on the coating material of the invention that is used. It is preferably from 10 s to 2 min.

Where use is made substantially of convective heat transfer, forced air ovens with a length of from 30 to 50 m, in particular from 35 to 45 m, are required at the preferred coil running speeds. The temperature of the forced air is preferably below 300° C., in particular below 280° C.

If two or more coating materials are applied during the coil coating operation, this is carried out on an appropriately configured line, in which two or more application stations and, where appropriate, curing stations are interposed in series. Alternatively, following application and curing of the first coating material, i.e., the coating material of the invention, the coated coil is wound up again and is then provided with second, third, etc. coatings, on one or both sides, on a second, third, etc. coil coating line.

Following the production of the coated coils of the invention, they can be wound up and then processed further at another place; alternatively, they can be processed further as they come directly from the coil coating operation. For instance, they may be laminated with plastics or provided with removable protective films. After cutting into appropriately sized parts, they can be shaped. Examples of suitable shaping methods include pressing and deep drawing.

The resultant coils, section elements, and moldings of the invention are scratch resistant, corrosion stable weathering stable, and chemicals stable, and can be overcoated with any of a wide variety of coating materials, without problems. It is surprising that there is no need for chromate pretreatment of the metal coils in order to obtain excellent corrosion protection.

In particular, however, the coils, section elements, and moldings of the invention are outstandingly weldable, especially by spot welding. The coatings of the invention produce better weld spots with a smoother, aesthetically more appealing periphery. In addition, the welded connections are particularly strong. The coatings of the invention also feature a comparatively broad welding range and a comparatively low volume resistance, and result in a particularly high welding electrode life quantity; in other words, the number of weld spots that can be applied using one electrode is particularly high.

The coils coated with the coatings of the invention are therefore outstandingly suitable for applications in automotive construction, for the purpose, for example, of producing bodywork parts and bodies, truck bodies, and caravan paneling, in the household appliance sector for producing, for example, washing machines, dishwashers, dryers, fridges, freezers or ranges, in the lighting sector for producing lights for interior and exterior use, or in the interior and exterior architectural sector, for producing, for example, ceiling and wall elements, doors, gates, pipe insulation, roller shutters or window sections.

EXAMPLES

Example 1

The Preparation of a Coil Coating Material

In a suitable vessel with stirrer, the following components were mixed in this order: 22.7 parts by weight of a saturated aliphatic polyester having an acid number of from 3 to 6 mg KOH/g, a hydroxyl number of 80 mg KOH/g, a number-average molecular weight of 3050 daltons, a polydispersity U=Mw/Mn−1 of 4.9, and a glass transition temperature of 17° C. [Uralac® SN 822 S1, 70% by weight in Solvesso® 100 (Exxon Mobil Chemicals) from D S M Kunstharze], 0.65 part by weight of a pyrogenic silica with bis(trimethylsilyl)amine surface modification (Aerosil® R 812 S from Degussa), 2.75 parts by weight of calcium-ion-modified silica (Shieldex® from Grace Davison), 2.99 parts by weight of zinc phosphate (Sicor® ZNP/S from Waardals Kjemiske Fabriken) and 3.53 parts by weight of Solvesso® 150 (Exxon Mobil Chemicals). The resulting mixture is predispersed for 10 minutes using a dissolver and then ground to a Hegmann fineness of 13 μm in a bead mill (grinding media: 2 mm SAZ glass beads) for 12 minutes with cooling. The ground material was then separated from the grinding media.

The ground material was mixed (made up to a paint) in the stated sequence with 1.79 parts by weight of a bisphenol A epichlorohydrin (Epikote® 834 from Shell Resins, CAS: 5068-38-6), 2.8 parts by weight of a partly methanol-etherified benzoguanamine-formaldehyde resin (Luwipal® LR 8817 from BASF AG), 2.5 parts by weight of a methanol-etherified melamine-formaldehyde resin (Luwipal® 072 from BASF AG), 59.18 parts by weight of iron phosphide (Ferrophos® HRS 2132, CAS: 1310-43-6), 1.0 part by weight of the adduct of isopropyl tris(dioctylpyrophosphato) titanate with one mole of diisooctyl phosphite (KEN-RE-ACT® KR38S from Kenrich Petrochemicals) and 1.1 parts by weight of Solvesso® 150 (Exxon Mobil Chemicals). The resulting made-up mixture was homogenized for 10 minutes using a dissolver.

For use as a coil coating material, the made-up mixture was adjusted to a viscosity of 80 s in the DIN 4 flow cup using Solvesso® 150.

Prior to application the coil coating material was admixed, based on 100 parts by weight of its solids, with 0.5 part by weight of a commercial, amine-blocked sulfonic acid (Nacure® 2500 from King Industries) and 3 parts by weight of a commercial acidic epoxy resin-phosphoric acid adduct (Epikote® 828 from Shell Resins).

Example 2

The Production of a Coating

For example 2, the inventive coil coating material from example 1 was used. Using coating rods, it was applied to steel plates of grade ZE 75/75 with chromate-free pretreatment, in a wet film thickness such that curing thereof in a flue-type dryer with a force air temperature of 260° C. and a PMT of 154° C. gave coatings with a dry film thickness of 8 µm.

In order to determine the weldability of the steel plates of example 2, pairs of steel plates were spot welded to one another in accordance with a DaimlerChrysler standard known to those in the art. Measurements were made of the welding range (kA), the volume resistance (ohms), and the electrode life quantities, i.e., the number of weld spots that could be applied using one electrode. In addition, quality features, such as the quality of the weld spots and the smoothness and aesthetics of the periphery around the weld spots, were assessed visually and each rated as follows:

| Rating | Signification |
|--------|---------------|
| 1 | very good |
| 2 | good |
| 3 | satisfactory, still usable |
| 4 | poor, unusable. |

Furthermore, the strength of the welded connections was determined qualitatively by hand and rated as follows: Rating Signification

| Rating | Signification |
|--------|---------------|
| 1 | very strong, virtually inseparable by hand |
| 2 | strong, difficult to separate by hand |
| 3 | easy to loosen by hand. |

The spot weldability of the steel plates of the invention was very good: welding range (kA):1.9; volume resistance (ohms): 0.0187; life quantity (number of welds): 1000; quality of weld spots: rating 1; periphery: rating 1; strength: rating 1.

The coatings of the invention were: chemically stable: exposure to methyl ethyl ketone: 70 double rubs; outstandingly deformable: T-bend test: 1.5; Erichsen cupping: 7 mm; cups with a stencil with a gap width of 0.9 mm using a tensile force of 4 kN: satisfactory=sat.; firmly adhering: cross-cut test in accordance with DIN ISO 2409: 1994-10, distance of cuts 1 mm, with adhesive tape removal: sat.; and of pronounced corrosion stability: salt spray test to DIN 50021-55, 1008 hours of exposure: result A: white rust at the edges; scribe: sat.; result B: creep in mm min./max.: left edge: 2.8/3; right edge: 2.6/2.9; scribe: 0.3/0.5; VDA (German Automakers Association) constant climate cycling test: white rust over the area; red rust at the edges: acceptable; creep in mm min./max.: left edge: 0/0.1; right edge: 0/0; scribe: 0/0.15.

What is claimed is:

1. A coating material for the coil coating process, comprising
   (A) as binder at least one polyester selected from the group consisting of aliphatic, araliphatic and aromatic polyesters having an acid number of <10 mg KOH/g, a hydroxyl number of from 30 to 200 mg KOH/g, and a number-average molecular weight Mn of between 1000 and 5000 daltons,
   (B) as crosslinking agent at least two amino-containing resins of different reactivity; and
   (C) at least one electrically conductive pigment in an amount to provide weldability to a coating prepared from the coating material in a coil coating process.

2. The coating material as claimed in claim 1, wherein the polyester (A) has a number-average molar mass of from 1500 to 4000 daltons.

3. The coating material as claimed in claim 1, wherein the polyester (A) has a molecular weight polydispersity of <10.

4. The coating material as claimed in claim 1, wherein the polyester (A) has a glass transition temperature of from −20 to +50° C.

5. The coating material as claimed in claim 1, comprising the polyester (A) in an amount of from 5 to 40% by weight, based on the solids of the coating material.

6. The coating material as claimed in claim 1, comprising at least one electrically conductive pigment (C) selected from the group consisting of elemental silicon and metallic, water-insoluble phosphides.

7. The coating material as claimed in claim 1, wherein crosslinking agent (B) comprises at least one member selected from the group consisting of benzoguanamine-formaldehyde resins that have been at least partly etherified with methanol and melamine-formaldehyde resin that have been at least partly etherified with methanol.

8. The coating material as claimed in claim 7, comprising crosslinking agent (B) in an amount of from 1 to 10% by weight, based on the solids of the coating material.

9. The coating material as claimed in claim 1, further comprising one or more of the following constituents:
   (D) at least one anticorrosion pigment,
   (E) at least one amorphous silica modified with metal ions,
   (F) at least two catalysts of the thermal crosslinking of N-methylol groups and/or N-methoxymethyl groups with the complementary hydroxyl groups,
   (G) at least one organic solvent,
   (H) at least one compound based on a polyphenol containing at least one epichlorohydrin group,
   (I) at least one surface-modified pyrogenic silica,
   (J) at least one compound of the general formula (I):

$$M_n(X)_m \qquad (I)$$

in which the variables and the indices have the following meanings:
   M is at least one central atom selected from the group of Lewis acceptors,
   X stands for Lewis donor ligands having at least one bridging atom selected from elements of main groups 5 and 6 of the Periodic Table of the Elements,
   n is from 1 to 500, and
   m is from 3 to 2000.

10. The coating material as claimed in claim 9, comprising an anticorrosion pigment (D) selected from the group consisting of zinc phosphate, zinc orthophosphate, zinc metaborate, and barium metaborate monohydrate.

11. The coating material as claimed in claim 9, comprising an amorphous silica (E), wherein the metal ions in the amorphous silica (E) are selected from the group consisting of alkaline earth metal ions, scandium ions, yttrium ions, and lanthanum ions, lanthanide ions, zinc ions, and aluminum ions.

12. The coating material as claimed in claim 9, comprising the organic solvent (G) in an amount of from 3 to 70% by weight, based on the total weight of the coating material.

13. The coating material as claimed in claim 9, comprising at least one compound (H), wherein the polyphenols which form the basis of the compounds (H) are selected from the group consisting of bisphenol A and bisphenol F.

14. The coating material as claimed in claim 9, comprising a compound (J) selected from the group consisting of compounds of the general formula II:

$$\text{RO-M}[-\text{O}-\text{P(O)(OH)}-\text{O}-\text{P(O)(OR}^1)_2]_3 \cdot \text{HP(O)(OR}^2)_2 \quad \text{(II)}$$

in which the variables R, R$^1$, and R$^2$ independently of one another stand for aliphatic and cycloaliphatic radicals and M is titanium, zirconium, or aluminum.

15. The coating material as claimed in claim 9, comprising two catalysts (F).

16. The coating material as claimed in claim 15, wherein at least one of the catalysts (F) is selected from the group (F1) consisting of acidic epoxy resin-phosphoric acid adducts and at least one other of the catalysts (F) is selected from the group (F2) consisting of blocked sulfonic acids.

17. The coating material as claimed in claim 16, wherein the weight ratio of catalyst (F1) to catalyst (F2) is from 20:1 to 1:3.

18. The coating material as claimed in claim 16, comprising the catalysts (F) in an amount of from 0.5 to 10% by weight, based on the solids of the coating material.

19. The coating material as claimed in claim 1, wherein the crosslinking agent (B) comprises at least one member selected from the group consisting of
(B1) benzoguanamine-formaldehyde resins and
(B2) melamine formaldehyde resins.

20. The coating material as claimed in claim 19, comprising a weight ratio of crosslinking agent (B1) to crosslinking agent (B2) of from 1:10 to 10:1.

21. A process for preparing a coating material as claimed in claim 19, which comprises
(1) mixing constituents (A), (I), (E), (D), and (G) in the stated order and grinding the resulting mixture to a Hegmann fineness of <20 μm, and
(2) adding the constituents (H), (B1), (B2), (C), (J), and (G) in the stated order to the ground mixture from step (1), and then
(3) homogenizing the resulting mixture of step (2).

22. The process as claimed in claim 21, wherein catalysts (F) are added to the mixture (3) prior to application of the coating material.

23. A process of preparing an article, comprising
coating a metal coil with a coating material as claimed in claim 1;
forming an automotive part or body, a household appliance, an article of interior or exterior lighting, or an architectural article from the coated metal coil.

* * * * *